United States Patent
Wu et al.

(10) Patent No.: US 10,733,603 B2
(45) Date of Patent: *Aug. 4, 2020

(54) METHOD AND APPARATUS FOR FACILITATING ELECTRONIC PAYMENTS USING A WEARABLE DEVICE

(71) Applicant: Alibaba Group Holding Limited, Grand Cayman (KY)

(72) Inventors: Chao Wu, Hangzhou (CN); Bin Shan, Hangzhou (CN); Xiaokai Zhou, Hangzhou (CN); Xiaochen Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,150

(22) Filed: Nov. 18, 2019

(65) Prior Publication Data

US 2020/0090169 A1 Mar. 19, 2020

Related U.S. Application Data

(63) Continuation of application No. 15/259,195, filed on Sep. 8, 2016, now Pat. No. 10,482,460.

(30) Foreign Application Priority Data

Sep. 11, 2015 (CN) .......................... 2015 1 0578511

(51) Int. Cl.
*G06Q 20/38* (2012.01)
*G06F 21/60* (2013.01)
(Continued)

(52) U.S. Cl.
CPC ......... *G06Q 20/3829* (2013.01); *G06F 21/33* (2013.01); *G06F 21/34* (2013.01);
(Continued)

(58) Field of Classification Search
CPC ..... G06Q 20/20; G06Q 20/208; G07G 1/0045
(Continued)

(56) References Cited

U.S. PATENT DOCUMENTS

| 8,459,545 B1 | 6/2013 | Hammer et al. |
| 8,500,031 B2 | 8/2013 | Naelon |

(Continued)

FOREIGN PATENT DOCUMENTS

| JP | 2000-200315 A | 7/2000 |
| JP | 2005-208821 A | 8/2005 |

(Continued)

OTHER PUBLICATIONS

International Search Report and Written Opinion to corresponding International Application No. PCT/US2016/050856 dated Dec. 1, 2016 (14 pages).

(Continued)

*Primary Examiner* — Edwyn Labaze
(74) *Attorney, Agent, or Firm* — James J. DeCarlo; Greenberg Traurig, LLP

(57) ABSTRACT

Apparatus and methods for binding a wearable device for use with the wearable device, a terminal, and a server are presented. The method executed by the wearable device includes providing device information to the terminal, receiving a device certificate from the server, and storing the device certificate for performing payment using the corresponding user account. The method executed by the server includes receiving a binding request from the wearable device via the terminal, generating a device certificate of the wearable device based on the device identification, and providing the device certificate to the wearable device. The method executed by the payee device includes acquiring a transaction certificate of a wearable device and sending a payment collection request to a server including the trans- (Continued)

action certificate of the wearable device and payment sum information.

42 Claims, 19 Drawing Sheets

(51) Int. Cl.
    *G06Q 30/06*     (2012.01)
    *G06Q 20/40*     (2012.01)
    *G06Q 20/32*     (2012.01)
    *H04B 1/3827*     (2015.01)
    *H04L 9/32*     (2006.01)
    *G09C 5/00*     (2006.01)
    *G06F 21/34*     (2013.01)
    *H04L 29/06*     (2006.01)
    *G06F 21/33*     (2013.01)
    *G06F 21/44*     (2013.01)

(52) U.S. Cl.
    CPC ........... *G06F 21/602* (2013.01); *G06Q 20/32* (2013.01); *G06Q 20/3226* (2013.01); *G06Q 20/3274* (2013.01); *G06Q 20/38215* (2013.01); *G06Q 20/40* (2013.01); *G06Q 30/06* (2013.01); *G09C 5/00* (2013.01); *H04B 1/385* (2013.01); *H04L 9/3263* (2013.01); *H04L 63/0823* (2013.01); *H04L 63/0853* (2013.01); *H04L 63/126* (2013.01); *G06F 21/44* (2013.01); *G06Q 2220/00* (2013.01); *H04B 2001/3861* (2013.01); *H04L 2209/56* (2013.01); *H04L 2209/805* (2013.01); *H04L 2463/102* (2013.01)

(58) Field of Classification Search
USPC ................................. 235/383, 379, 375, 487
See application file for complete search history.

(56) References Cited

U.S. PATENT DOCUMENTS

| | | |
|---|---|---|
| 9,208,505 B1 | 12/2015 | Zhou et al. |
| 9,262,759 B2 | 2/2016 | Hanson et al. |
| 9,342,829 B2 | 5/2016 | Zhou et al. |
| 9,384,481 B2 | 7/2016 | Hanson et al. |
| 9,390,415 B2 | 7/2016 | Hanson et al. |
| 9,544,299 B2 | 1/2017 | Takeda |
| 2008/0229098 A1 | 9/2008 | Ishak |
| 2010/0138908 A1 | 6/2010 | Vennelakant et al. |
| 2012/0016793 A1 | 1/2012 | Peters et al. |
| 2012/0024947 A1 | 2/2012 | Naelon |
| 2012/0143768 A1 | 6/2012 | Hammand et al. |
| 2012/0216042 A1 | 8/2012 | Brown et al. |
| 2012/0254031 A1 | 10/2012 | Walker et al. |
| 2013/0095754 A1 | 4/2013 | Moreton et al. |
| 2013/0146659 A1 | 6/2013 | Zhou et al. |
| 2013/0173461 A1 | 7/2013 | Levy |
| 2014/0236842 A1 | 8/2014 | Salminen et al. |
| 2014/0249948 A1 | 9/2014 | Graylin et al. |
| 2014/0258709 A1 | 9/2014 | Takeda |
| 2014/0299660 A1 | 10/2014 | Melzer |
| 2015/0039494 A1 | 2/2015 | Sinton et al. |
| 2015/0073907 A1 | 3/2015 | Purves et al. |
| 2015/0242837 A1 | 8/2015 | Yarbrough et al. |
| 2015/0294303 A1 | 10/2015 | Hanson et al. |
| 2015/0317626 A1* | 11/2015 | Ran .................... G06Q 20/3829 705/76 |
| 2016/0042346 A1 | 2/2016 | Pastore et al. |
| 2016/0086161 A1 | 3/2016 | Zhou et al. |
| 2016/0095017 A1* | 3/2016 | Ely ........................ H04W 4/027 455/454 |
| 2016/0189137 A1 | 6/2016 | Zhou et al. |
| 2016/0253651 A1* | 9/2016 | Park ........................ G07F 9/023 705/39 |
| 2016/0253664 A1* | 9/2016 | Yuan ..................... G06F 21/445 705/71 |
| 2017/0018001 A1 | 1/2017 | Tunnell et al. |

FOREIGN PATENT DOCUMENTS

| | | |
|---|---|---|
| JP | 2012-191472 A | 10/2012 |
| JP | 2014-157430 A | 8/2014 |
| JP | 2014-174560 A | 9/2014 |
| WO | 0211111981 A2 | 9/2011 |

OTHER PUBLICATIONS

International Preliminary Report on Patentability to corresponding International Application No. PCT/US2016/050856 dated Mar. 22, 2018 (13 pages).

Extended European Search Report to European Application No. 16845080.7 dated Mar. 26, 2019 (7 pages).

* cited by examiner

METHOD AND APPARATUS FOR FACILITATING ELECTRONIC PAYMENTS USING A WEARABLE DEVICE

CROSS-REFERENCE TO RELATED APPLICATIONS

This application is a continuation of U.S. patent application Ser. No. 15/259,195, filed Sep. 8, 2016 (now U.S. Pat. No. 10,482,460), which claims the benefit of priority from Chinese Patent Application No. 201510578511.6, filed on Sep. 11, 2015, entitled "Method and Apparatus for Binding Wearable Device, Method and Apparatus for Electronic Payment," both of which are incorporated herein by reference in their entirety.

BACKGROUND

Field of the Disclosure

The present disclosure generally relates to the field of electronic payment technologies, and in particular, to utilizing a binding between a wearable device and a server to execute an electronic payment operation.

Description of Related Art

Wearable devices are portable devices that can be worn by a user or integrated in the user's clothes or accessories, such as bands, smart watches, smart shoes, smart clothes, smart glasses, a smart helmet, a smart ring, etc. Wearable devices have increasingly incorporated functionality previously reserved for personal computing devices and can be connected to a terminal (e.g., smart phones, tablet computers, and personal computers) through a wired or wireless interface. By allowing wearable devices to connect to terminals, wearable devices can implement additionally functionality by exchanging data with the terminal.

Currently, wearable devices can be used for electronic payment operations. In existing systems, when a user wishes to make a payment using a wearable device, the user first requests a payment code from a server providing a payment service via a mobile device. In response to the request, the server generates a payment code and sends the payment code to the mobile device. Additionally, the server records a relationship between the payment code and a user account associated with the mobile device. The mobile device then forwards the received payment code to the wearable device and the wearable device displays the payment code. A merchant's payee device scans the payment code and sends transaction data (e.g., the payment code, the payment sum, and other transaction information) to the server. The server deducts the payment sum from the user account corresponding to the payment code and transfers the sum to the merchant's account, thereby completing the payment.

In the payment process described above, when the connection between the wearable device and the cell phone is poor, or the network performance between the cell phone and the server is poor, the wearable device generally cannot obtain the payment code or cannot display the payment code in time, resulting in failure of the payment transaction.

BRIEF SUMMARY

One aspect of the disclosure is drawn to a method for binding a wearable device. The method includes establishing a connection between the wearable device and a terminal; providing device information of the wearable device to a terminal, the device information including a device identification; receiving a device certificate from a server, the device certificate generated by the server based on the device identification and a user account associated with the wearable device; and storing the device certificate on the wearable device, the device certificate enabling the wearable device to perform a payment operation using the user account, wherein the payment operation is capable of being performed by the wearable device if the established connection between the wearable device and the terminal is not detected and wherein the payment operation comprises: generating a transaction certificate based on the device certificate; and providing the transaction certificate to a payee device.

Another aspect of the disclosure is drawn to a method for binding a wearable device. The method includes receiving a binding request from the wearable device via a terminal, the binding request including a device identification of the wearable device and user account information associated with the wearable device; generating a device certificate of the wearable device based on the device identification and a user account associated with the wearable device; storing a relationship between the device certificate and a user account associated with the wearable device; and providing the device certificate to the wearable device, the device certificate enabling the wearable device to perform a payment operation using the user account wherein the payment operation is capable of being performed by the wearable device if an established connection between the wearable device and the terminal is not detected.

Another aspect of the disclosure is drawn to a method for binding a wearable device. The method includes establishing a connection between a wearable device and the terminal; acquiring device information of the wearable device, the device information including a device identification of the wearable device; sending a binding request to a server, the binding request including the device identification of the wearable device and user account information, the binding request enabling the server to generate a device certificate corresponding to a user account associated with the wearable device and provide the device certificate to the wearable device; and transmitting the device certificate to the wearable device using the established connection, the device certificate enabling the wearable device to perform a payment operation using the user account wherein the payment operation is capable of being performed by the wearable device if the established connection between the wearable device and the terminal is not detected.

Another aspect of the disclosure is drawn to a method for facilitating electronic payments. The method includes establishing a connection between the wearable device and a terminal; receiving a device certificate corresponding to a user account associated with the wearable device from the terminal; generating a transaction certificate according to a stored device certificate for a user account associated with the wearable device, wherein the transaction certificate is capable of being generated by the wearable device if the established connection between the wearable device and a terminal is not detected; and providing the transaction certificate to a payee device, the transaction certificate enabling the payee device to upload the transaction certificate to a server for processing a payment using the user account corresponding to the device certificate.

Another aspect of the disclosure is drawn to a method for facilitating electronic payments. The method includes receiving a payment collection request sent by a payee device, the payment collection request including a transaction certificate generated by a wearable device and payment sum information; restoring a device certificate of the wearable device from the transaction certificate; and processing a payment according to the payment sum information using a user account corresponding to the device certificate as payer based on a relationship between the device certificate of the wearable device and the user account stored by the server.

Another aspect of the disclosure is drawn to a method for facilitating electronic payments. The method includes acquiring a transaction certificate of a wearable device, the transaction certificate generated by the wearable device according to a device certificate corresponding to a user account associated with the wearable device, wherein the transaction certificate is capable of being generated by the wearable device if an available connection between the wearable device and a terminal is not detected; and sending a payment collection request to a server, the payment collection request including the transaction certificate of the wearable device and payment sum information, the payment collection request being configured for allowing the server to restore the device certificate from the transaction certificate, and perform a payment operation according to the payment sum information using the user account corresponding to the device certificate.

One aspect of the disclosure is drawn to a wearable device. The wearable device includes one or more processors, and a non-transitory computer-readable medium storing computer-executable instructions. When executed by the one or more processors, the instructions cause the wearable device to establish a connection between the wearable device and a terminal; provide device information of the wearable device to a terminal, the device information including a device identification; receive a device certificate from a server, the device certificate generated by the server based on the device identification and a user account associated with the wearable device; and store the device certificate on the wearable device, the device certificate enabling the wearable device to perform a payment operation using the user account, wherein the payment operation is capable of being performed by the wearable device if the established connection between the wearable device and the terminal is not detected and wherein the payment operation cause the wearable device to: generate a transaction certificate based on the device certificate; and provide the transaction certificate to a payee device.

Another aspect of the disclosure is drawn to a server. The server includes one or more processors, and a non-transitory computer-readable medium storing computer-executable instructions. When executed by the one or more processors, the instructions cause the server to receive a binding request from a wearable device via a terminal, the binding request including a device identification of the wearable device and user account information from the terminal; generate a device certificate of the wearable device based on the device identification; store a relationship between the device certificate and a user account associated with the wearable device; and provide the device certificate to the wearable device, the device certificate enabling the wearable device to perform a payment operation using the user account wherein the payment operation is capable of being performed by the wearable device if an available connection between the wearable device and the terminal is not detected.

Another aspect of the disclosure is drawn to a terminal. The terminal includes one or more processors, and a non-transitory computer-readable medium storing computer-executable instructions. When executed by the one or more processors, the instructions cause the terminal to establish a connection between a wearable device and the terminal; acquire device information of a wearable device, the device information including a device identification of the wearable device; send a binding request to a server, the binding request including the device identification of the wearable device and user account information, the binding request enabling the server to generate a device certificate corresponding to a user account associated with the wearable device and provide the device certificate to the wearable device; and transmit the device certificate to the wearable device using the established connection, the device certificate enabling the wearable device to perform a payment operation using the user account wherein the payment operation is capable of being performed by the wearable device if the established connection between the wearable device and the terminal is not detected.

Another aspect of the disclosure is drawn to a wearable device. The wearable device includes one or more processors, and a non-transitory computer-readable medium storing computer-executable instructions. When executed by the one or more processors, the instructions cause the wearable device to establish a connection between the wearable device and a terminal; receive a device certificate corresponding to a user account associated with the wearable device from the terminal; generate a transaction certificate according to a stored device certificate for a user account associated with the wearable device, wherein the transaction certificate is capable of being generated by the wearable device if the established connection between the wearable device and a terminal is not detected; and provide the transaction certificate to a payee device, the transaction certificate enabling the payee device to upload the transaction certificate to a server for processing a payment using the user account corresponding to the device certificate.

Another aspect of the disclosure is drawn to a server. The server includes one or more processors, and a non-transitory computer-readable medium storing computer-executable instructions. When executed by the one or more processors, the instructions cause the server to receive a payment collection request sent by a payee device, the payment collection request including a transaction certificate generated by a wearable device and payment sum information, wherein the transaction certificate is capable of being generated by the wearable device if an available connection between the wearable device and a terminal is not detected; restore a device certificate of the wearable device from the transaction certificate; and process a payment according to the payment sum information using a user account corresponding to the device certificate based on a relationship between the device certificate of the wearable device and the user account stored by the server.

Another aspect of the disclosure is drawn to a payee device. The payee device includes one or more processors, and a non-transitory computer-readable medium storing computer-executable instructions. When executed by the one or more processors, the instructions cause the payee device to acquire a transaction certificate of a wearable device, the transaction certificate generated by the wearable device according to a device certificate corresponding to a user account associated with the wearable device, wherein the transaction certificate is capable of being generated by the wearable device if an available connection between the wearable device and a terminal is not detected; and send a payment collection request to a server, the payment collection request including the transaction certificate of the wearable device and payment sum information, the payment collection request being configured for allowing the server to restore the device certificate from the transaction certificate, and perform a payment operation according to the payment sum information using the user account corresponding to the device certificate.

It can be seen from the embodiments described herein that a device certificate generated by a server is stored in a wearable device, a correspondence between the device certificate and a user account is established at the server side, and the wearable device can perform a payment operation by using the device certificate, without the need of receiving a payment code from a terminal or from the server in real time. Therefore, even when communication between the wearable device used by a user and the terminal or between the terminal and the server is disconnected, a payment operation can still be executed using the wearable device, thereby improving the success rate of the payment and increasing the degree of convenience for the user.

DETAILED DESCRIPTION

In order to make the objectives, technical solutions, and advantages of the present disclosure more clear, the present disclosure will be described below in detail with reference to the accompanying drawings and the particular embodiments.

Figure 1:
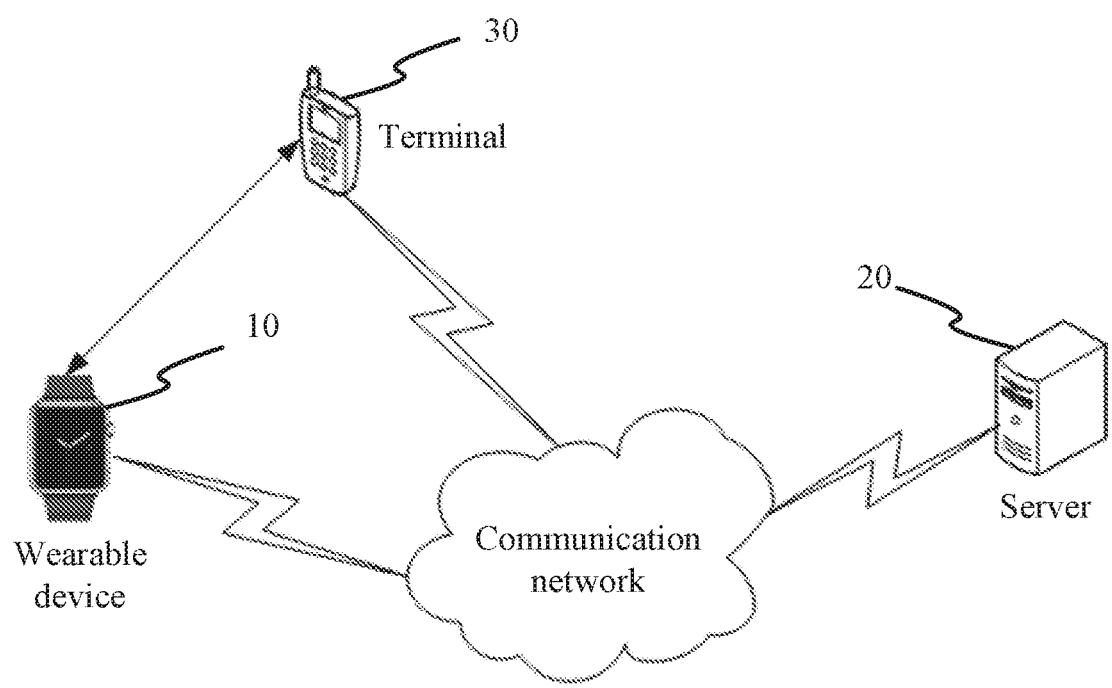
FIG. 1 is a network environment for use with a wearable device, according to some embodiments of the disclosure.

FIG. 1 illustrates a network environment for use with a wearable device, according to some embodiments of the disclosure.

As illustrated in FIG. 1, the wearable device 10 may be connected to a terminal 30 using a hardware interface or a wireless local network. The hardware interface may be, for example, an audio interface, a Universal Serial Bus (USB) interface, or the like. The wireless local network may be, for example, a Bluetooth network, an 802.11 network ("Wi-Fi"), a ZigBee network, or the like. The terminal 30 may be a smart phone, tablet computer, personal computer, or the like. The terminal 30 communicates with a server 20 through a communication network (for example, the Internet or a mobile communications network).

In some embodiments, the wearable device 10 may also directly communicate with the server 20 through Wi-Fi, a mobile communication network, or the like. In these embodiments, the type of the terminal 30, the hardware interface or the protocol of the wireless local network through which the wearable device 10 is connected to the terminal 30, the protocol and networking structure of the communication network, the specific implementation manner of the server 20, and the like, are all not limited in the embodiments of the disclosure.

In some embodiments of the present disclosure, the server 20 provides a payment service, and may be a physical or logical server. The server 20 may also be two or more physical or logical servers sharing different responsibilities, cooperating to implement various functions of the server 20 in the embodiments of the present disclosure.

Figure 2:
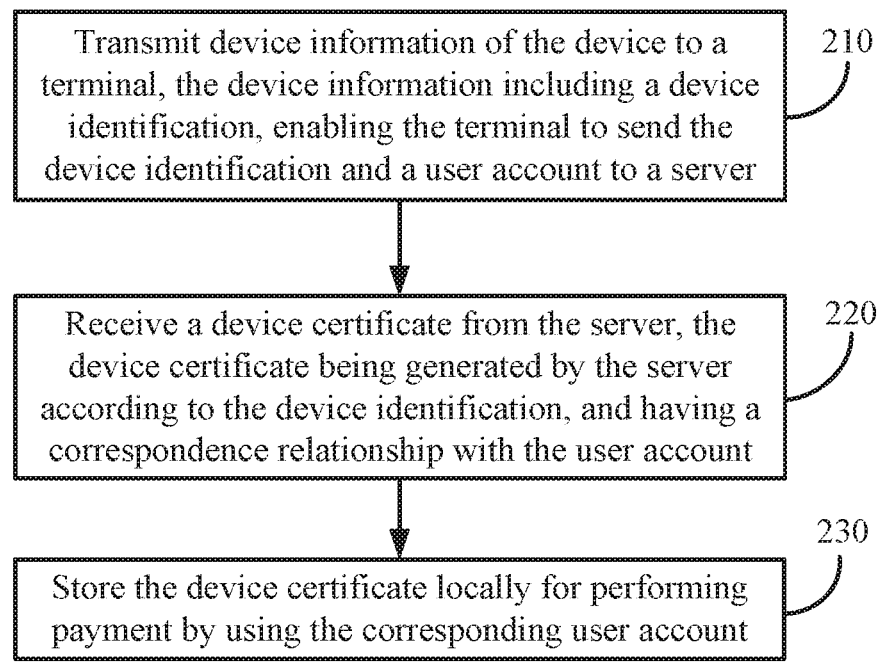
FIG. 2 is a flow diagram illustrating a method for binding a wearable device from the perspective of the wearable device, according to some embodiments of the disclosure.
Figure 3:
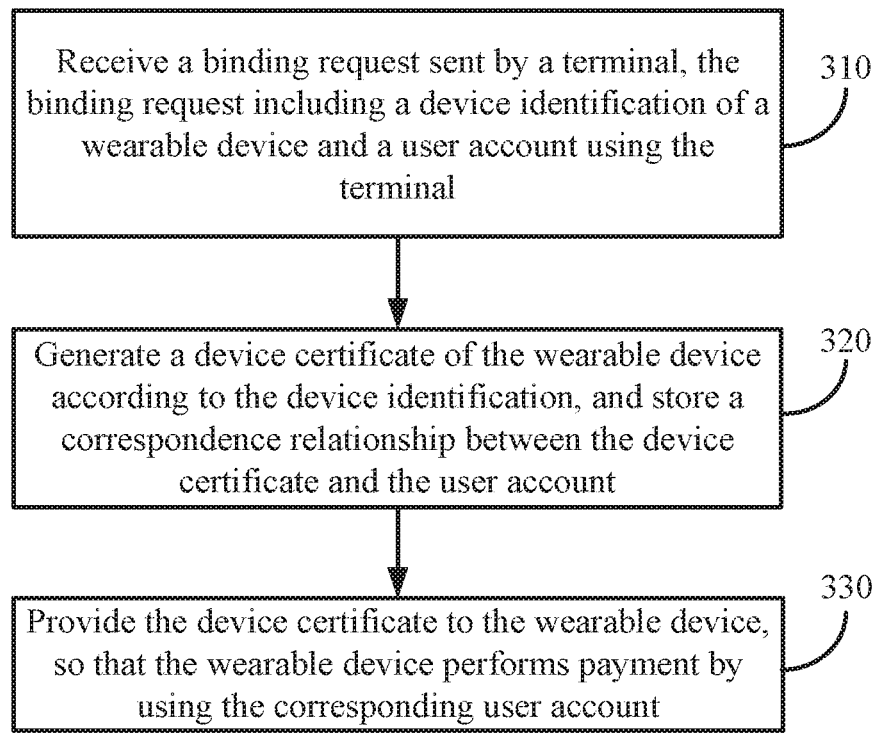
FIG. 3 is a flow diagram illustrating a method for binding a wearable device from the perspective of a server, according to some embodiments of the disclosure.
Figure 4:
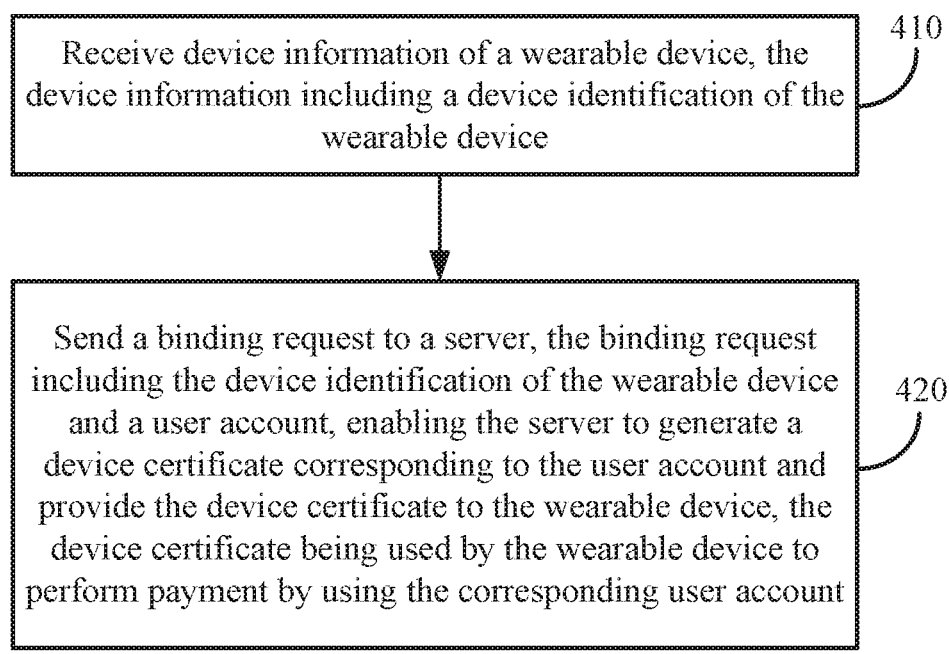
FIG. 4 is a flow diagram illustrating a method for binding a wearable device from the perspective of a terminal, according to some embodiments of the disclosure.

FIGS. 2 through 4 are flow diagrams illustrating a method for binding a wearable device according to some embodiments of the disclosure.

Specifically, FIG. 2 is a flow diagram illustrating a method for binding a wearable device from the perspective of the wearable device, according to some embodiments of the disclosure. FIG. 3 is a flow diagram illustrating a method for binding a wearable device from the perspective of a server, according to some embodiments of the disclosure. FIG. 4 is a flow diagram illustrating a method for binding a wearable device from the perspective of a terminal, according to some embodiments of the disclosure.

In step 210, the method transmits device information from the wearable device to a terminal. In one embodiment, device information includes a device identification, enabling the terminal to send the device identification and a user account to the server. Likewise, in step 410, device information of the wearable device is received by a terminal, the device information including the device identification of the wearable device.

The device identification of the wearable device may be used to uniquely identify the wearable device, and varies according to different types of devices, manufacturers, and wireless local network protocols adopted. Generally, it may be a hardware address of the wearable device (e.g., a Media Access Control address) or an identifier granted by a manufacturer to the wearable device (e.g., a Universally Unique Identifier). The device information of the wearable device may further include a hardware model, version information of system software installed on the wearable device, a connection type that can be adopted between the wearable device and the terminal, and connection parameters thereof, and the like.

The wearable device may provide the device information to the terminal after receiving a predetermined operation of a user. Alternatively, or in conjunction with the foregoing, the wearable device may forward the device information to the terminal upon a request from the terminal.

In current systems, an operating system of the terminal generally has the ability to connect to the wearable device based on certain communication protocols using one or more functions. Payment client software on the terminal can retrieve or receive device information from the wearable device using these functions. However, this requires implementation of client software, which varies according to different operating systems, and is thus client-specific. To avoid this problem, in some embodiments of the disclosure, the wearable device may, after receiving the predetermined operation of the user, generate a two-dimensional code including the device information and display the two-dimensional code on a screen for the terminal to scan. In these embodiments, the terminal scans the two-dimensional code displayed by the wearable device and obtains the device information of the wearable device from the two-dimensional code.

In step 420, the method sends a binding request to the server from the terminal. The binding request includes the device identification of the wearable device and a user account, enabling the server to generate a device certificate corresponding to the user account. Subsequently, the terminal provides the device certificate to the wearable device.

The wearable device generally does not provide the user with the ability to manually input information. Thus, a user account on the server for payment associated with the user using the wearable device (that is, the user using the terminal) may be input and stored on the terminal by the user. The terminal combines the user account and the device identification of the wearable device in the binding request and sends the binding request to the server. In step 310, the method receives the binding request sent by the terminal at the server.

In step 320, the method, at the server, generates a device certificate of the wearable device based on the device identification. Further, a relationship between the device certificate and the user account is stored (e.g., in a database).

After receiving the binding request sent by the terminal, the server extracts the device identification of the wearable device and the user account of the user using the wearable device from the binding request. The server obtains the device certificate of the wearable device by using the device identification as an input and executing a predetermined mapping algorithm. The device certificate may be a character string comprising one or more numerals, letters, and symbols, or may also be a digital certificate. The particular embodiment of the device certificate is not limited in this disclosure. The server may adopt any mapping algorithm that can map different device identifications to different device certificates, and is also not limited in this disclosure.

The server may store the relationship between the device certificate it generates for the wearable device and the user account using the wearable device in an accessible storage location, for example, locally in the server, in a storage device accessible through a network, or in cloud storage.

In step 330, the method provides the device certificate to the wearable device from the server, so that the wearable device may perform payment operations using the corresponding user account.

On the wearable device, in step 220, the method receives the device certificate from the server, the device certificate being generated by the server according to the device identification and corresponding to the user account using the wearable device. In some embodiments, the server may send the device certificate to the terminal first and the terminal may then forward the device certificate to the wearable device.

In some embodiments, the wearable device can communicate with the server directly through Wi-Fi or a mobile communication network. In such scenarios, the wearable device may, after providing the device information of the device to the terminal, send an authorization request to the server, the authorization request including the device identification of the device. The server may then receive both the binding request from the terminal and the authorization request from the wearable device. Both the binding request and the authorization request may include the device identification of the wearable device. The server includes the device certificate it generates for the device identification in a response to the authorization request, sends the response to the wearable device, and stores the relationship between the device certificate and the user account in the binding request. The wearable device then receives the device certificate of the device sent by the server.

To increase the security of the device certificate during transmission, in some embodiments the device certificate may be encrypted before and while the server transmits the device certificate to the wearable device. In some embodiments, the same or corresponding encryption and decryption algorithms are pre-configured on the wearable device and on the server, and the wearable device generates a device-side key and a server-side key used for encrypting the device certificate. Depending on the encryption and decryption algorithms adopted, the device-side key and the server-side key may be the same or may be related to each other. The wearable device stores the device-side key locally, and provides the server-side key to the server. The wearable device may send the server-side key to the terminal, and the terminal may include the server-side key in the binding request and send the binding request to the server. The server obtains, from the binding request, the server-side key generated by the wearable device, encrypts a device certificate of the wearable device by using the server-side key and sends the encrypted device certificate to the terminal, wherein the terminal forwards it to the wearable device. In an embodiment where the wearable device can directly communicate with the server, the wearable device may include the server-side key in the authorization request and send the authorization request to the server. The server then encrypts the device certificate of the wearable device by using the server-side key, and returns to the wearable device a response to the authorization request, the response including the encrypted device certificate. The wearable device receives the device certificate encrypted by the server-side key from the server and obtains the device certificate after performing decryption by using the device-side key.

In some embodiments, the same or related encryption and decryption algorithms are pre-configured on the wearable device and on the server. The server may generate a device-side key and a server-side key used for encrypting the device certificate. The server may then provide the device-side key to the wearable device. The server may send the device-side key to the terminal and the terminal may forward the key to the wearable device. In an embodiment where the server can directly communicate with the wearable device, it may also directly send the device-side key to the wearable device.

On the wearable device, in step 230, the method stores the device certificate locally for performing payment by using the corresponding user account. The wearable device stores locally the device certificate generated by the server, and therefore, electronic payment is enabled by using the device certificate associated with the user account.

After encrypting the device certificate by using an encryption algorithm, the wearable device may store ciphertext locally, so as to improve the security of the device certificate. When the device certificate needs to be used, the wearable device may decrypt the ciphertext. Encryption and decryption are both performed on the wearable device locally, and any encryption and decryption algorithms supported by the wearable device can be used. The encryption and decryption algorithms may be the same as or different from each other, which is not limited in this disclosure.

In some embodiments, in order to improve the security of the payment process, the server may generate a corresponding security certificate for each user account. When delivering the device certificate, the server may provide the security certificate along with the device certificate to the wearable device. In these embodiments, the server stores the relationships between the user account, the device certificate, and the security certificate. After receiving the device certificate and the security certificate, the wearable device stores them locally. The security certificate is used to perform security validation on the device certificate during payment of the wearable device, detailed descriptions of which may be obtained with reference to embodiments described herein.

In some embodiments, the server generates the device certificate according to the device identification of the wearable device, and binds the device certificate with the user account using the wearable device provided by the terminal. The wearable device may perform payment by using the device certificate which is corresponding to a user account, so that the payment process does not need the participation of the terminal. By not requiring the participation of the terminal the method avoids influences on the payment process caused by the strength of the connection or network performance between the terminal and the wearable device and between the terminal and the server, thereby improving the success rate of payments and providing more convenience to the user.

Figure 5:
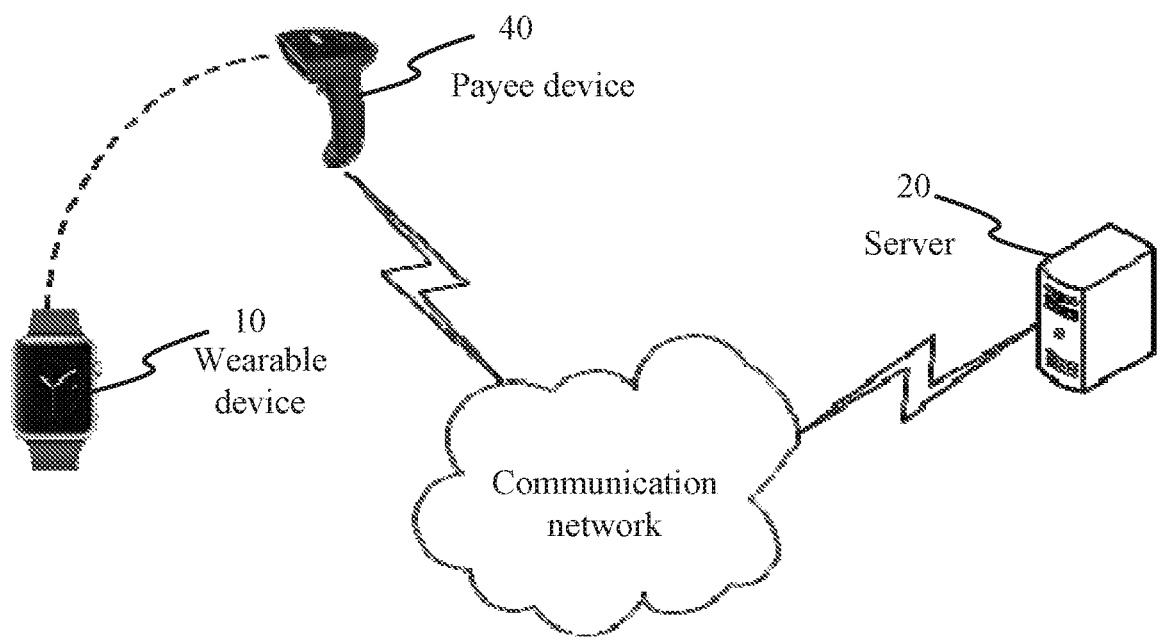
FIG. 5 is a network environment for use with a wearable device, according to some embodiments of the disclosure.

FIG. 5 is a network environment for use with a wearable device, according to some embodiments of the disclosure.

A wearable device 10 may transmit and receive data with a payee device 40 in a connected manner or a non-connected manner. The connected manner may comprise, for example, a Wi-Fi, Bluetooth, or similar network protocol. The unconnected manner may be, for example, optical scanning, etc. The payee device 40 can acquire data from the wearable device 10, and communicate with the server 20 through a communication network. The payee device 40 may be a single device or may be a combination of multiple devices implementing the above functionality. The type and components of the payee device 40, the data transmission manner between the wearable device 10 and the payee device 40, the protocol and networking structure of the communication network, the specific implementation manner of the server 20, and the like, are not limited to the embodiments of the present disclosure.

In some embodiments, a device certificate is stored on the wearable device. The device certificate corresponds to a user account used for performing payment on the server, and the user account belongs to a user using the wearable device. The relationship between the device certificate of the wearable device and the user account is stored in a storage location accessible by the server. Detailed descriptions may be obtained with reference to the embodiments above, and are not repeated herein for the sake of clarity.

Figure 6:
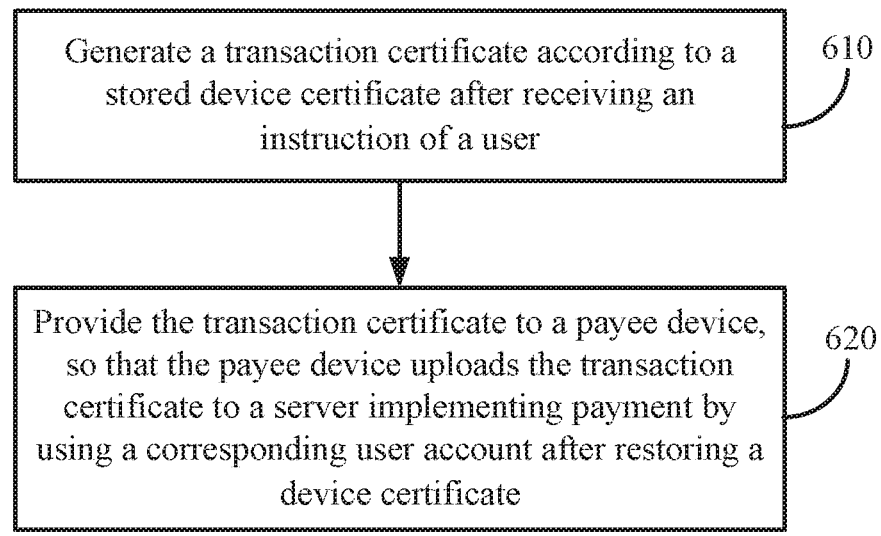
FIG. 6 is a flow diagram illustrating a method for facilitating electronic payments from the perspective of the wearable device, according to some embodiments of the disclosure.
Figure 7:
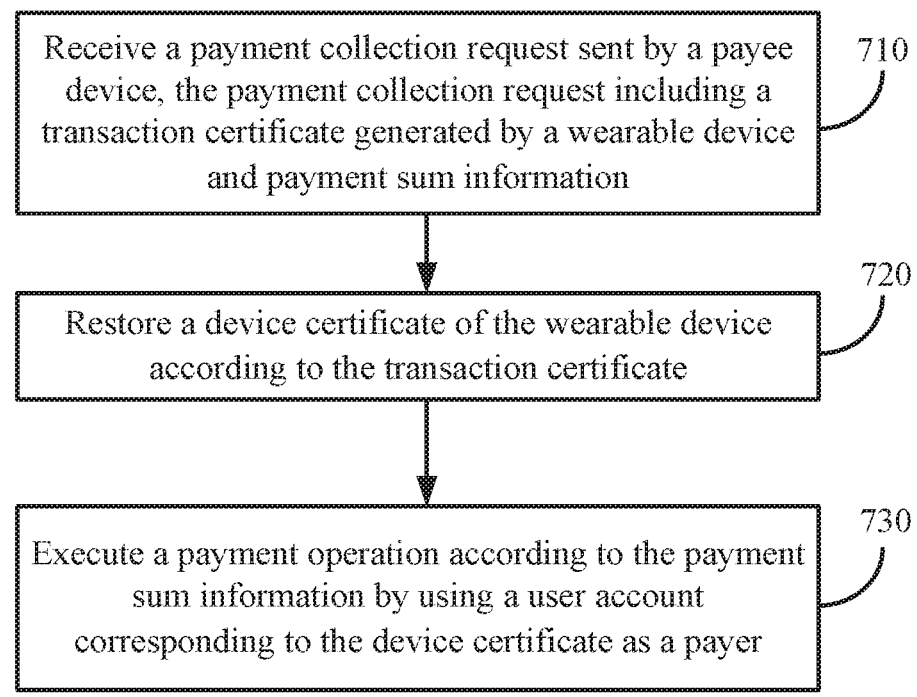
FIG. 7 is a flow diagram illustrating a method for facilitating electronic payments from the perspective of a server, according to some embodiments of the disclosure.
Figure 8:
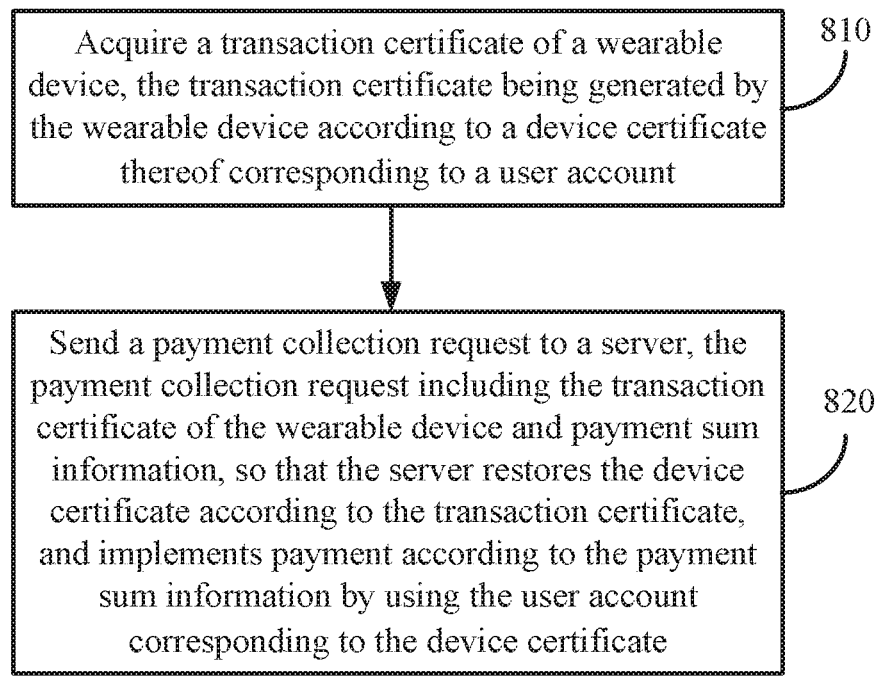
FIG. 8 is a flow diagram illustrating a method for facilitating electronic payments from the perspective of a terminal, according to some embodiments of the disclosure.

FIGS. 6 through 8 are flow diagrams illustrating a method for facilitating electronic payments according to some embodiments of the disclosure.

Specifically, FIG. 6 is a flow diagram illustrating a method for facilitating electronic payments from the perspective of the wearable device, according to some embodiments of the disclosure. FIG. 7 is a flow diagram illustrating a method for facilitating electronic payments from the perspective of a server according to some embodiments of the disclosure. FIG. 8 is a flow diagram illustrating a method for facilitating electronic payments from the perspective of a terminal according to some embodiments of the disclosure.

On the wearable device, in step 610, the method generates a transaction certificate based on a stored device certificate after receiving an instruction from the user. When the user wishes to pay a payee using a wearable device, the instruction received in step 610 may be a start payment operation that is executed on the wearable device. The wearable device receives the instruction of the user, reads the stored device certificate, and generates a transaction certificate.

Depending on the type of payee device and the manner of communication between the wearable device and the payee device, the transaction certificate may be a character string, a certificate, a two-dimensional code, a bar code, and the like. The transaction certificate is uploaded to the server as the identity information of a payer and the server calculates the device certificate in the reverse direction (i.e., from the transaction certificate) and uses the user account corresponding to the device certificate as the payer account. The specific algorithm for generating the transaction certificate may be selected according to the forms of the device certificate and the transaction certificate in actual usage, which is not limited to this embodiment, as long as the server can obtain the device certificate according to the transaction certificate using a reversed algorithm.

In some embodiments, the device certificate stored by the wearable device is a device certificate ciphertext after being encrypted by using an encryption algorithm. The wearable device reads the stored device certificate ciphertext, performs decryption by using a corresponding decryption algorithm to obtain the device certificate, and generates the transaction certificate using the device certificate.

It should be noted that, in this embodiment, the wearable device has the hardware and software resources required for generating and providing the transaction certificate. For example, in an embodiment using a two-dimensional code or a bar code as the transaction certificate, the wearable device may include any required hardware resources, such as a screen that can clearly display the two-dimensional code or bar code, enough computing capability and storage space, and software resources such as a two-dimensional code or bar code software tool package.

On the wearable device, in step 620, the method provides the transaction certificate to a payee device, so that the payee device can later upload the transaction certificate to the server, the server performing payment by using the corresponding user account after the device certificate is restored. Upload and payment operations on the payee device and server, respectively, are described more fully herein.

On the payee device, in step 810, the method acquires the transaction certificate of the wearable device. The transaction certificate is generated by the wearable device according to the device certificate corresponding to the user account. In some embodiments, the wearable device may send the device certificate to the payee device using a wired or wireless connection between the wearable device and the payee device, and may also display the device certificate on the screen for the payee device to scan.

On the payee device, in step 820, the method sends a payment collection request to the server. The payment collection request includes the transaction certificate of the wearable device and payment sum information, enabling the server to restore the device certificate according to the transaction certificate and perform payment according to the payment sum information using the user account corresponding to the device certificate.

On the server, in step 710, the method receives the payment collection request sent by the payee device. As discussed previously, the payee device combines the payment sum information and the transaction certificate that is acquired from the wearable device into the payment collection request, and sends the payment collection request to the server. The payment sum information includes a payment amount, and may further include other information related to the payment. For example, when being used for transaction payment, the payment sum information may further include the name, the quantity, or the amount of a transacted goods or service. The payment collection request may further include a payee account.

On the server, in step 720, the method restores the device certificate of the wearable device according to the transaction certificate. According to the algorithm that the wearable device uses to generate the device certificate, the server may use a reversed algorithm to restore the device certificate of the wearable device from the transaction certificate.

On the server, in step 730, the method executes a payment service according to the payment sum information by using the user account corresponding to the device certificate as the payer.

According to the storage location of the relationship between the device certificate of the wearable device and the user account, the server can determine which user account is associated with the restored device certificate. The server deducts an amount determined by the payment sum information from the user account corresponding to the device certificate and pays the amount to the payee account, thereby completing the payment operation. The server returns a result to the payee device indicating whether the payment is successful.

To increase the security of the payment process, in some embodiments, the server may perform security validation on the transaction certificate generated by the wearable device. Various security validation manners may be used in the payment process, which is not limited in this disclosure.

In some embodiments, when delivering the device certificate to the wearable device in the binding process, the server delivers a corresponding security certificate along with the device certificate to the wearable device. In one embodiment, in step 610, the wearable device generates the transaction certificate (including validation information) using a certificate generation algorithm according to the stored device certificate and the security certificate. In step 720, the server obtains the device certificate and the security certificate of the wearable device by using a certificate restoration algorithm according to the transaction certificate, wherein the certificate generation algorithm used by the wearable device and the certificate restoration algorithm used by the server are corresponding encryption/decryption algorithms. In step 730, the server performs validation on the transaction certificate (or the restored device certificate) according to the security certificate stored on the server side and the restored security certificate, and after successful validation, implements payment according to the payment sum information by using the user account corresponding to the restored device certificate as the payer.

In the above embodiments, the selected certificate generation algorithm, the certificate restoration algorithm and the security certificates matching these two algorithms may be determined according to the requirements of the implementation environment, which are not limited in this disclosure. Moreover, the security certificate may change over time, so as to further increase the reliability of the validation. Specifically, the wearable device may start a synchronous timing operation in conjunction with the server in the binding process, the same security certificate change algorithm is pre-configured on the wearable device and on the server, and according to the algorithm, the security certificate is changed to another identical value on the wearable device and on the server at a predetermined time interval. In this way, the transaction certificate generated by the wearable device in step 610 is only valid within a predetermined time interval, and once the predetermined time interval expires, the security certificate on the server is changed, so that the transaction certificate cannot pass security validation. Therefore, the payment operation cannot be implemented. The security certificate change algorithm in this example may be implemented using a payment code generation algorithm of a payment code known in the art and is not described in detail herein.

In some embodiments, in the binding process, the server stores relationships between the device identification of the wearable device, the user account, and the device certificate. The wearable device generates the transaction certificate according to the device identification thereof, the device certificate, and security certificate delivered by the server. In this way, the server can perform security validation on the wearable device by using the device identification restored from the transaction certificate. Thus, even when the device identification and the security certificate are embedded into an illegal wearable device, no loss will be incurred by the user.

In some embodiments, the wearable device performs payment by using the transaction certificate generated using the locally stored device certificate. The server restores the device certificate by using the transaction certificate, and executes a payment operation using the corresponding user account as the payer according to the correspondence between the stored device certificate and the user account. The wearable device does not need to directly transmit data with the terminal or the server in the payment process, and can perform payment in an offline state. In this way, the payment will not be affected if an available connection is not detected between the wearable device and the terminal and between the terminal and the server, thereby improving the success rate of the payment.

In one embodiment of the present disclosure, a wearable device of a user can be connected to a terminal of the user through a Bluetooth network. In this embodiment, a payment client application of the same payment platform is respectively installed in the terminal and the wearable device and the payment application on the terminal can communicate with a server of the payment platform through a mobile communication network or Wi-Fi.

Figure 9:
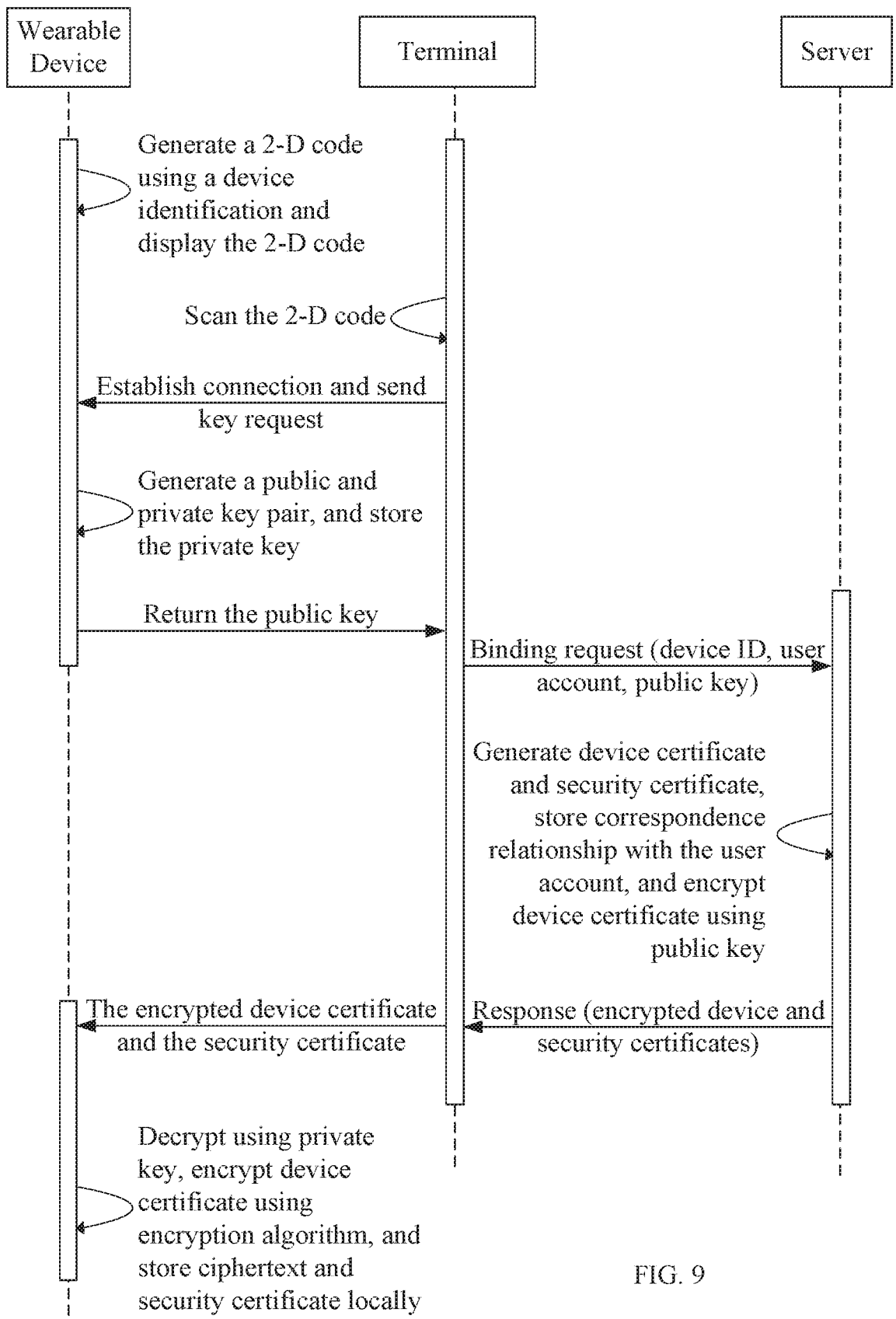
FIG. 9 is a swim lane diagram illustrating a method for binding a wearable device, according to some embodiments of the disclosure.

FIG. 9 is a swim lane diagram illustrating a method for binding a wearable device according to some embodiments of the disclosure.

Figure 10:
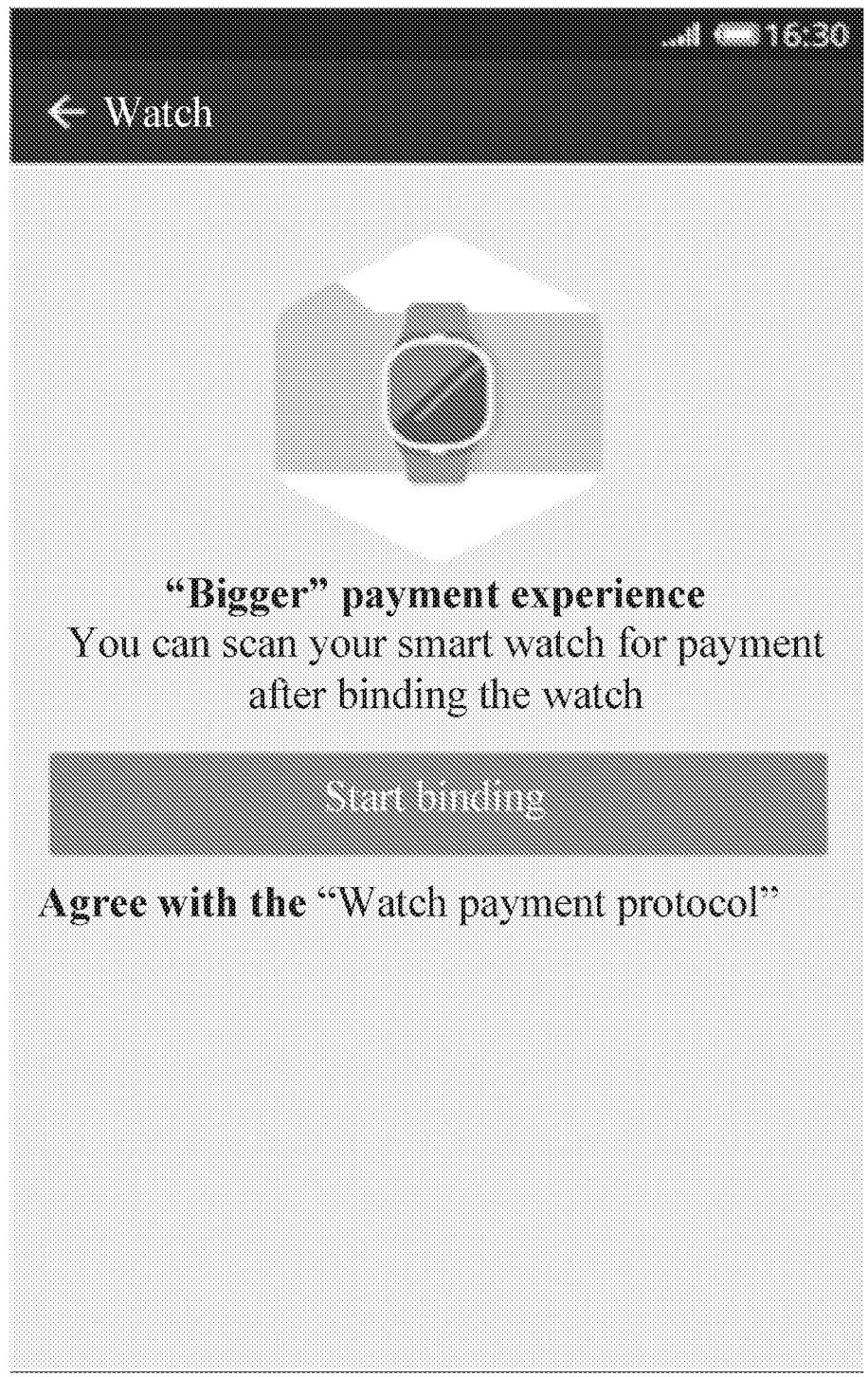
FIG. 10 is a diagram of an interface for initiating a binding process on the terminal, according to some embodiments of the disclosure.
Figure 11:
FIG. 11 is a diagram of an interface for prompting the user to scan a wearable device to acquire device information, according to some embodiments of the disclosure.

When the user uses a payment application installed at the terminal, a user account and a password registered to a server need to be input for login. After logging in, the user can start a process of binding the wearable device to the payment application in the terminal. One embodiment of an interface for initiating a binding process on the terminal is illustrated in FIG. 10. In FIG. 10, when the user presses the "Start binding" button, information prompting the user how to operate the payment application is subsequently displayed on the terminal. One embodiment of an interface for prompting the user to scan a wearable device to acquire device information is illustrated in FIG. 11.

Returning to FIG. 9, the payment application on a wearable device provides a function for generating a two-dimensional code using device information. After the user starts the function, the wearable device displays a two-dimensional code representing device identification and other device information (including other connection parameters for performing Bluetooth connection with the wearable device).

The user scans the two-dimensional code displayed on the wearable device using the terminal, obtaining the device information of the wearable device. The terminal extracts the device information therein, and, in one embodiment, establishes a Bluetooth connection with the wearable device. After successfully connecting, the terminal sends a key request to the wearable device. The wearable device generates a corresponding public key and a private key by using, for example, an asymmetric encryption algorithm, stores the private key locally as a device-side key, and sends the public key to the terminal as a server-side key in a response to the key request.

The terminal generates a binding request including the device identification of the wearable device, the user account for the terminal to login to the server, and the public key and sends the binding request to the server.

The server generates a device certificate based on the device identification in the binding request, designates a security certificate for the wearable device, and stores a relationship between the device certificate, the security certificate, and the user account in the same binding request. The server encrypts the device certificate by using the public key, generates a response to the binding request including the encrypted device certificate and the security certificate, and sends the response to the terminal. Before generating the device certificate, the server may require the terminal to provide the password of the user account to perform security confirmation, and if the terminal cannot provide the correct password, the binding process fails and terminates.

After receiving the response to the binding request, the terminal sends the encrypted device certificate to the wearable device through, for example, a Bluetooth connection.

The wearable device decrypts the encrypted device certificate by using the stored private key, obtaining the device certificate. Then, the wearable device encrypts the device certificate by using the pre-configured encryption algorithm, and stores the device certificate ciphertext locally after the encryption. The wearable device and the server start synchronous timing, and after the timing is started, according to the same security certificate change algorithm pre-configured on the wearable device and on the server, the security certificate stored on the wearable device and the security certificate stored on the server undergo synchronous identical change over the timing interval. Thus, the binding of the wearable device to the user account succeeds, and the binding process ends.

Figure 12:
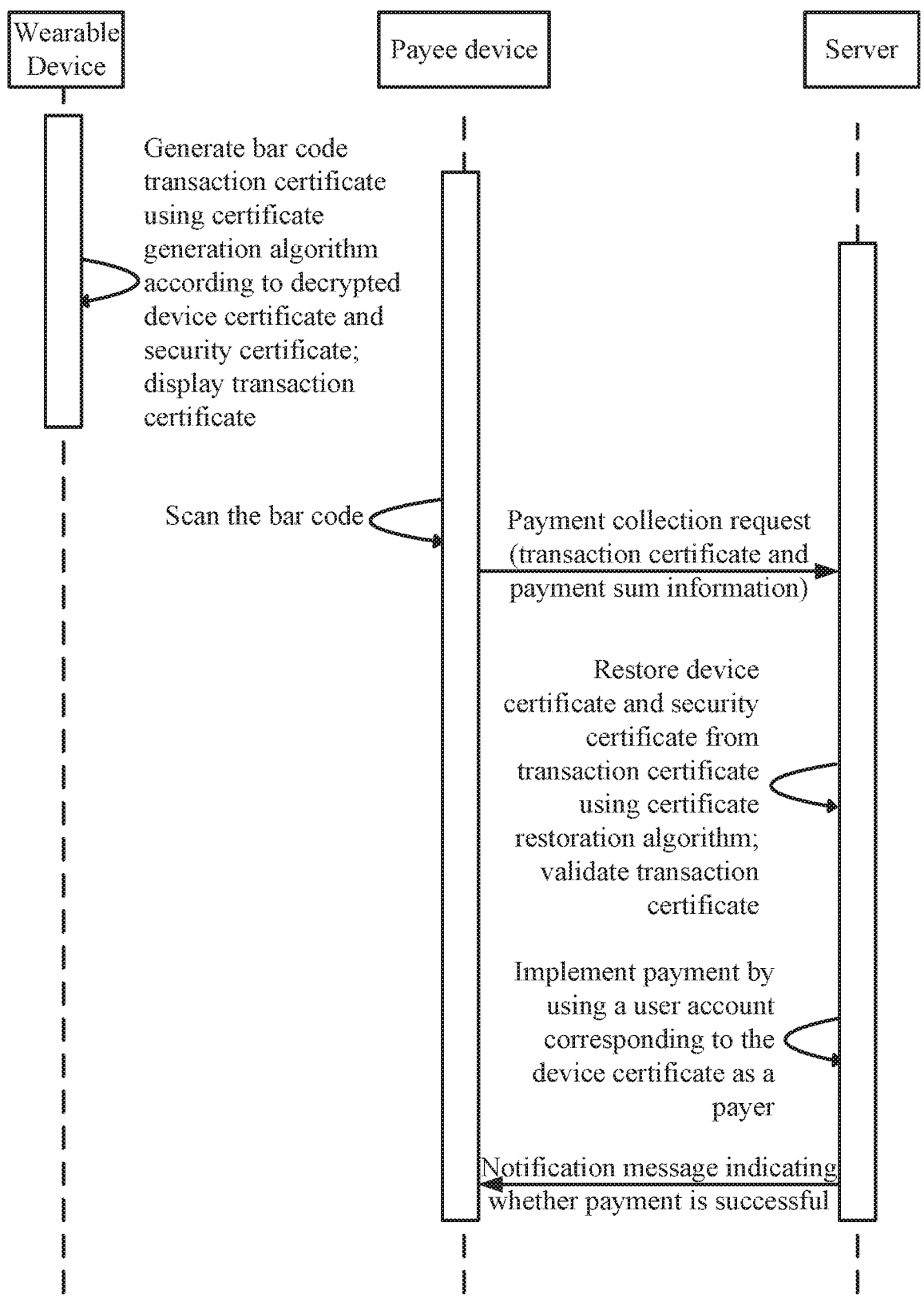
FIG. 12 is a swim lane diagram illustrating a method for performing payment by using the wearable device, according to some embodiments of the disclosure.

FIG. 12 is a swim lane diagram illustrating a method for performing payment by using the wearable device according to some embodiments of the disclosure.

When the user wishes to pay a merchant for a desired commodity by using the wearable device, the user may start a payment process in a payment application of the wearable device. After receiving an instruction from the user to start the payment process, the wearable device reads a device certificate ciphertext from local memory, and decrypts the ciphertext by using a pre-configured decryption algorithm to obtain the device certificate. By using a certificate generation algorithm, and using a security certificate matching the current timing interval and the device certificate as inputs, the wearable device obtains a transaction certificate including validation information. The transaction certificate is in the form of a bar code, and the wearable device displays the bar code on the screen.

A merchant payee device scans the bar code to obtain the transaction certificate generated by the wearable device. The payee device then creates a payment collection request including the transaction certificate, the name and the quantity or amount of the commodity, the transaction sum, and the like, and sends the payment collection request to the server.

The server restores the transaction certificate into the device certificate and the security certificate by using a certificate restoration algorithm. The server compares the restored security certificate with the security certificate in the server side that matches the timing interval, and if the two are the same, then the transaction certificate (or the restored device certificate) is successfully validated, otherwise, the payment process fails. If the device certificate is successfully validated, a user account associated with the device certificate is searched for, and the payment of the transaction sum is executed using the user account as the payer, and an account of the merchant as the payee account. Before the payment is implemented, the server may validate whether the account of the merchant is legal or not. The validation process of the merchant account in this embodiment may be a conventional validation process, and is not described in detail herein.

The server then sends a notification message to the payee device of the merchant indicating whether the payment is successful and the payment process ends.

Figure 13:
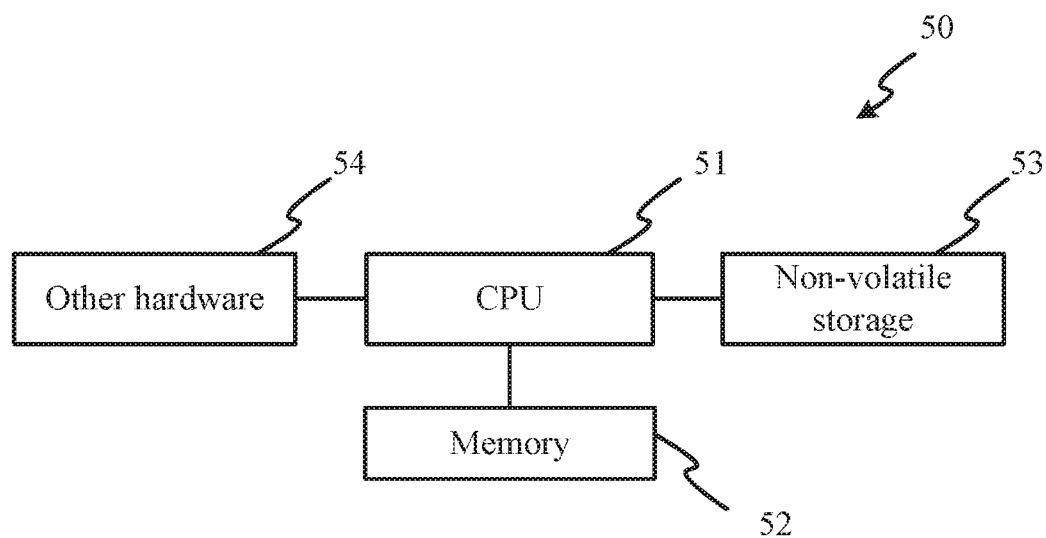
FIG. 13 is a structural diagram of a wearable device, a terminal, or a server, according to some embodiments of the disclosure.

Embodiments of the present disclosure further provide three types of apparatuses for binding a wearable device that are respectively applied to a wearable device, a terminal, and a server, and three types of electronic payment apparatuses that are respectively applied to a wearable device, a payee device, and a server. The six types of apparatuses may all be implemented through software, and may also be implemented through hardware, or a combination of software and hardware. The apparatuses are implemented in some embodiments as one or more processors, application-specific integrated circuits (ASICs), or programmable logic devices (PLDs) such as field programmable gate arrays (FPGAs), together with appropriate software or programming for performing the methods described hereinabove. Thus, the units of the apparatuses described below are implemented in some embodiments as one or more processors, application-specific integrated circuits (ASICs), or programmable logic devices (PLDs) such as field programmable gate arrays (FPGAs), executing appropriate software or programming for performing the actions described below. Taking a software implementation as an example, a logical apparatus is formed by reading a computer program instruction by the central process unit (CPU) of a wearable device, a terminal, a payee device, or a server into a memory where the instruction is executed. From the perspective of hardware 50, in addition to the CPU 51, the memory 52, and a non-volatile storage 53 shown in FIG. 13, the wearable device or the terminal where the apparatus is disposed generally further includes other hardware 54 such as a chip used for receiving and transmitting a wireless signal, and the payee device or the server where the apparatus is disposed generally further includes other hardware such as a board or microprocessor used for implementing a network communication function.

Figure 14:
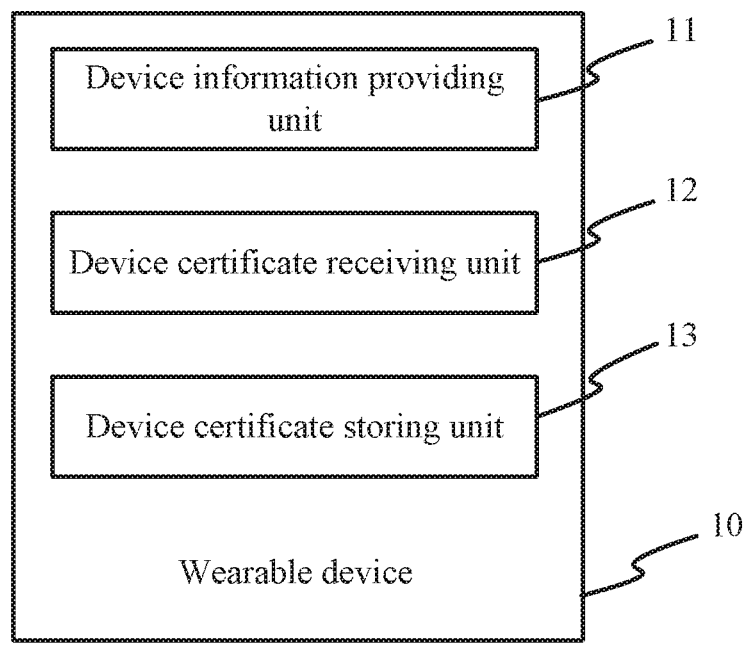
FIG. 14 is a structural diagram of an apparatus for binding a wearable device, applied to a wearable device, according to some embodiments of the disclosure.

FIG. 14 shows an apparatus for binding a wearable device provided in an embodiment of the present disclosure, applied to a wearable device 10. The apparatus includes a device information providing unit 11, a device certificate receiving unit 12, and a device certificate storing unit 13. The device information providing unit 11 is used for providing device information of the device to a terminal, the device information including device identification, so that the terminal sends the device identification and a user account using the terminal to a server. The device certificate receiving unit 12 is used for receiving a device certificate from the server, the device certificate being generated by the server according to the device identification, and having a correspondence with the user account. The device certificate storing unit 13 is used for storing the device certificate locally and for performing payment by using the corresponding user account.

In some embodiments, the device information providing unit 11 is used for displaying a two-dimensional code carrying the device information for the terminal to scan. In some embodiments, the device certificate receiving unit 12 is used for receiving the device certificate from the server forwarded by the terminal.

In some embodiments, the apparatus further includes an authorization request sending unit used for sending an authorization request to the server, the request including the device identification of the device. In these embodiments, the device certificate receiving unit 12 is further used for receiving the device certificate of the device sent by the server.

In some embodiments, the device certificate receiving unit 12 is further used for receiving the device certificate and a security certificate from the server, the security certificate used for performing validation on the device certificate during payment.

In some embodiments, the apparatus further includes a transmission key unit used for generating a device-side key and a server-side key for the encryption of the device certificate during transmission, storing the device-side key locally, and providing the server-side key to the server, the device-side key being the same as or corresponding to the server-side key. The device certificate from the server includes the device certificate from the server and encrypted by using the server-side key. The apparatus may further include a transmission decrypting unit used for decrypting the received encrypted device certificate by using the device-side key, so as to obtain the device certificate.

In some embodiments, the device certificate storing unit 13 is used for encrypting the device certificate by using an encryption algorithm, and storing ciphertext locally.

Figure 15:
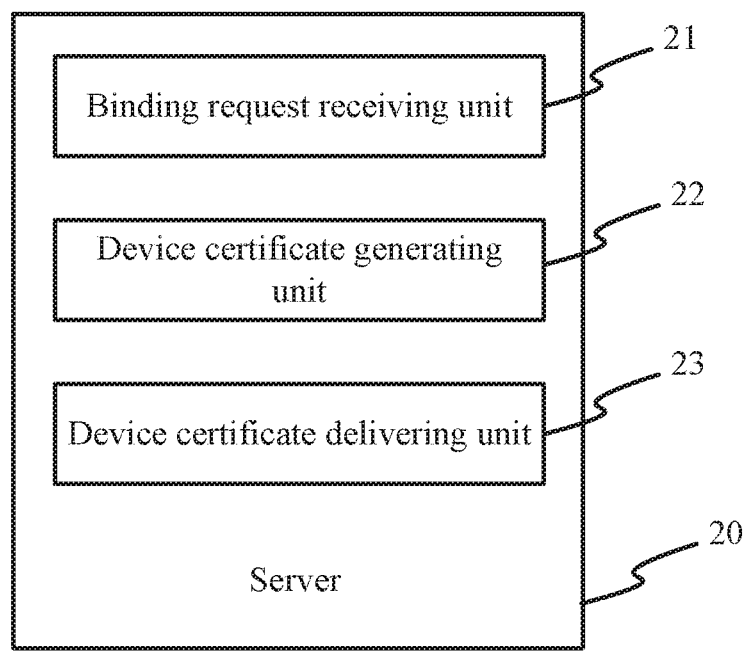
FIG. 15 is a structural diagram of an apparatus for binding a wearable device, applied to a server, according to some embodiments of the disclosure.

FIG. 15 shows an apparatus for binding a wearable device provided in an embodiment of the present disclosure, applied to the server 20.

The apparatus includes a binding request receiving unit 21, a device certificate generating unit 22, and a device certificate delivering unit 23. The binding request receiving unit 21 is used for receiving a binding request sent by a terminal, the binding request including a device identification of the wearable device and a user account using the terminal. The device certificate generating unit 22 is used for generating a device certificate of the wearable device according to the device identification, and stores a correspondence between the device certificate and the user account. The device certificate delivering unit 23 is used for providing the device certificate to the wearable device, so that the wearable device performs payment by using the corresponding user account.

In some embodiments, the device certificate delivering unit 23 may further be used for sending the device certificate to the terminal, which then forwards the device certificate to the wearable device.

In some embodiments, the binding request further includes a server-side key generated by the wearable device. In these embodiments, the device certificate delivering unit 23 may further be used for encrypting a device certificate by using the server-side key, and sending the encrypted device certificate to the terminal, which then forwards the device certificate to the wearable device.

In some embodiments, the apparatus may further include an authorization request receiving unit used for receiving an authorization request sent by the wearable device, the authorization request including the device identification of the wearable device. In these embodiments, the device certificate delivering unit 23 may further be used for returning to the wearable device a response to the authorization request, the response including the device certificate.

In some embodiments, the authorization request further includes the server-side key generated by the wearable device. The device certificate included in the response is a device certificate having been encrypted by the server-side key.

In some embodiments, the device certificate delivering unit 23 may further be used for providing the device certificate and a security certificate to the wearable device, the security certificate being used for performing validation on the device certificate during payment.

Figure 16:
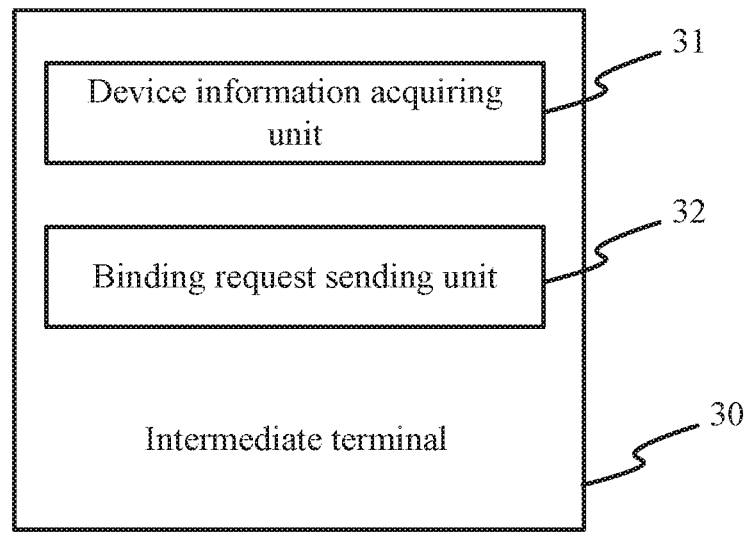
FIG. 16 is a structural diagram of an apparatus for binding a wearable device, applied to a terminal, according to some embodiments of the disclosure.

FIG. 16 shows an apparatus for binding a wearable device 10 provided in an embodiment of the present disclosure, applied to a terminal 30.

The apparatus includes a device information acquiring unit 31 and a binding request sending unit 32. The device information acquiring unit 31 is used for acquiring device information of the wearable device 10, the device information including a device identification of the wearable device 10. The binding request sending unit 32 is used for sending a binding request to a server, the binding request including the device identification of the wearable device 10 and a user account using the terminal, so that the server generates a device certificate corresponding to the user account and provides the device certificate to the wearable device 10, the device certificate being used by the wearable device 10 to perform payment by using the corresponding user account.

In some embodiments, the apparatus may further include a device certificate forwarding unit used for receiving the device certificate returned by the server, and forwarding the device certificate to the wearable device 10.

In some embodiments, the apparatus may further include a transmission key receiving unit used for receiving a server-side key from the wearable device 10, the server-side key being used by the server to encrypt the device certificate delivered to the wearable device 10. The binding request further includes the server-side key.

In some embodiments, the device information acquiring unit 31 may further be used for scanning a two-dimensional code displayed by the wearable device 10, and acquiring the device information of the wearable device 10 from two-dimensional code information.

Figure 17:
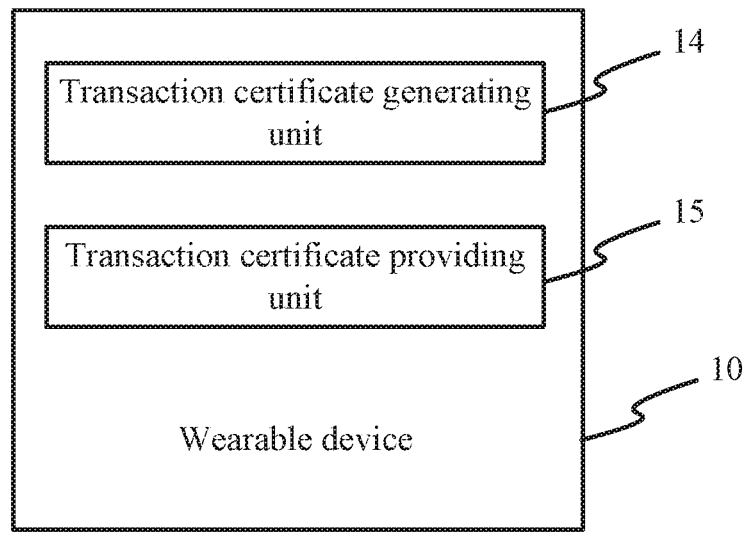
FIG. 17 is a structural diagram of an electronic payment apparatus, applied to a wearable device, according to some embodiments of the disclosure.

FIG. 17 shows an electronic payment apparatus provided in an embodiment of the present disclosure, applied to a wearable device 10, the wearable device 10 storing a device certificate corresponding to a user account.

The apparatus includes a transaction certificate generating unit 14 and a transaction certificate providing unit 15. The transaction certificate generating unit 14 is used for generating a transaction certificate according to the stored device certificate after receiving an instruction of a user. The transaction certificate providing unit 15 is used for providing the transaction certificate to a payee device, so that the payee device uploads the transaction certificate to a server implementing payment by using the corresponding user account after restoring the device certificate.

In some embodiments, the stored device certificate is a device certificate ciphertext encrypted by using an encryption algorithm. The transaction certificate generating unit 14 may then be used for reading the stored device certificate ciphertext to perform decryption after receiving the instruction of the user, and generating the transaction certificate according to the device certificate obtained after the decryption.

In some embodiments, the wearable device 10 further stores a security certificate corresponding to the user account. The transaction certificate generating unit 14 may then be used for generating a transaction certificate carrying validation information by using a certificate generation algorithm according to the stored device certificate and the security certificate after receiving the instruction of the user, the certificate generation algorithm corresponding to a certificate restoration algorithm adopted by the server for restoring the device certificate and the security certificate according to the transaction certificate.

In some embodiments, the transaction certificate includes a two-dimensional code or a bar code.

Figure 18:
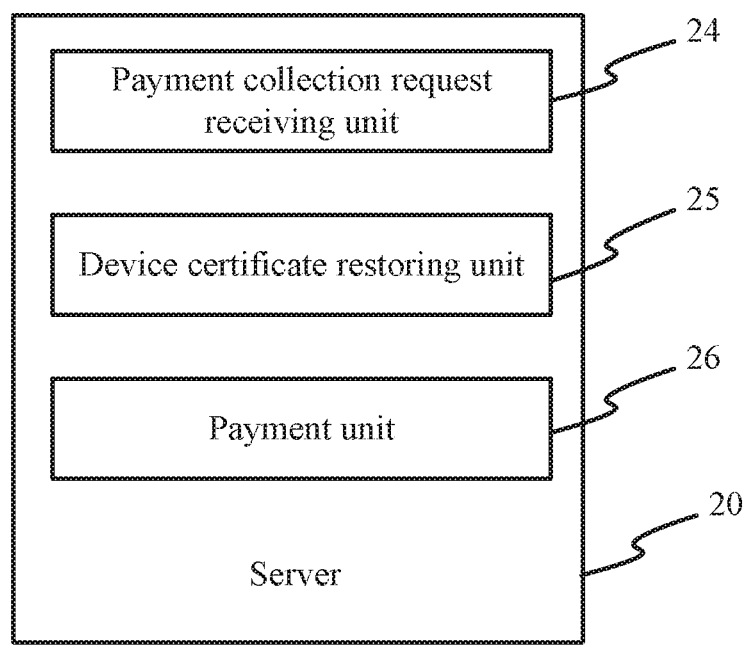
FIG. 18 is a structural diagram of an electronic payment apparatus, applied to a server, according to some embodiments of the disclosure.

FIG. 18 shows an electronic payment apparatus provided in an embodiment of the present disclosure, applied to a server 20 which may identify a correspondence between a device certificate of a wearable device and a user account using the wearable device.

The apparatus includes a payment collection request receiving unit 24, a device certificate restoring unit 25, and a payment unit 26. The payment collection request receiving unit 24 is used for receiving a payment collection request sent by a payee device. The payment collection request including a transaction certificate generated by the wearable device and payment sum information. The device certificate restoring unit 25 is used for restoring the device certificate of the wearable device according to the transaction certificate. The payment unit 26 is used for implementing payment according to the payment sum information by using the user account corresponding to the device certificate as the payer.

In some embodiments, the device certificate restoring unit 25 may be used for obtaining the device certificate and a security certificate of the wearable device by using a certificate restoration algorithm according to the transaction certificate, the certificate restoration algorithm corresponding to a certificate generation algorithm adopted by the wearable device for generating the transaction certificate. In some embodiments, the payment unit 26 may be used for performing validation on the transaction certificate by using the security certificate, and after successful validation, executing the payment according to the payment sum information by using the user account corresponding to the device certificate as the payer.

In some embodiments, the apparatus further includes a payment result sending unit used for returning a result to the payee device indicating whether payment is successful.

Figure 19:
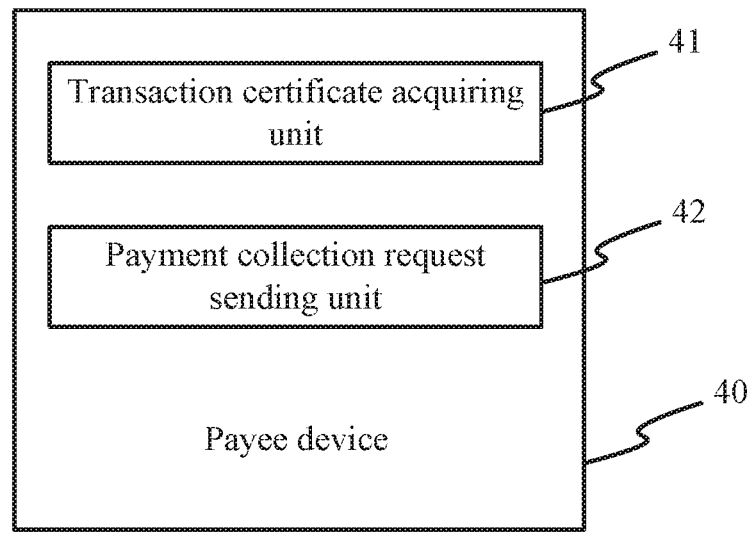
FIG. 19 is a structural diagram of an electronic payment apparatus, applied to a payee device, according to some embodiments of the disclosure.

FIG. 19 is an electronic payment apparatus provided in an embodiment of the present disclosure, applied to a payee device 40.

The apparatus includes a transaction certificate acquiring unit 41 and a payment collection request sending unit 42. The transaction certificate acquiring unit 41 is configured to acquire a transaction certificate of a wearable device, the transaction certificate being generated by the wearable device according to a device certificate corresponding to a user account. The payment collection request sending unit 42 is used for sending a payment collection request to a server, the payment collection request including the transaction certificate of the wearable device and payment sum information, so that the server restores the device certificate according to the transaction certificate, and performs payment according to the payment sum information by using the user account corresponding to the device certificate.

In some embodiments, the apparatus further includes a payment result receiving unit used for receiving a result returned by the server indicating whether payment is successful.

Described above are merely preferred embodiments of the present disclosure, which are not intended to limit the present disclosure. Any modification, equivalent substitution, improvement, etc., made without departing from the spirit and principle of the present disclosure shall fall within the protection scope of the present disclosure.

In a typical configuration, a computer device includes one or more processors (CPU), an input/output interface, a network interface, and a memory. The memory may include computer readable media such as a volatile memory, a random access memory (RAM) and/or a non-volatile memory or the like, for example, a read only memory (ROM) or a flash RAM. The memory is an example of computer readable media.

Computer readable media includes non-volatile and volatile media as well as movable and non-movable media, and can implement information storage by means of any method or technology. Information may be a computer readable instruction, a data structure, and a module of a program or other data. Examples of storage media of a computer include but not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission media which can be used to store information accessible by a computing device. According to the definition of this text, computer readable media do not include transitory media, such as a modulated data signal and a carrier wave.

It should be further noted that, the terms "include", "comprise" or any other variations thereof are intended to encompass "comprising" in a non-exclusive sense, so that a process, method, commodity or device including a series of elements not only includes those elements, but also includes other elements not explicitly listed, or further includes inherent elements of the process, method, commodity or device. In a case where there is no further limitation, an element defined by the phrase "including a . . . " does not exclude the presence of additional identical elements in the process, method, commodity or device including the element.

Persons skilled in the art should understand that, the embodiments of the present disclosure may be provided as a method, a system, or a computer program product. Therefore, the present disclosure may be implemented as an embodiment of pure hardware, an embodiment of pure software, or an embodiment combining software and hardware. Moreover, the present disclosure may adopt the form of a computer program product implemented on one or more computer usable storage media (including, but not limited to, a magnetic disk memory, a CD-ROM, an optical memory, and the like) comprising computer usable program codes therein.

What is claimed is:

1. A non-transitory computer readable storage medium for tangibly storing computer program instructions capable of being executed by a computer processor, the computer program instructions defining the steps of:
    providing, by a wearable device, device information of the wearable device to a terminal based on an established connection between the wearable device and the terminal, the device information including a device identification;
    receiving, by the wearable device, a device certificate from a server, the device certificate generated by the server based on the device identification and the device certificate corresponding to a user account associated with the wearable device;
    generating, by the wearable device, a device-side key and a server-side key used for encrypting the device certificate during transmission, the device-side key generated based on the server-side key;
    storing, by the wearable device, the device-side key on the wearable device;
    transmitting, by the wearable device, the server-side key to the server; and
    storing, by the wearable device, the device certificate on the wearable device, the device certificate enabling the wearable device to perform a payment operation using the user account, the payment operation capable of being performed by the wearable device if the established connection between the wearable device and the terminal is not detected, the payment operation comprising:
        generating, by the wearable device, a decrypted device certificate by decrypting the device certificate using the device-side key, the device certificate encrypted by the server using the server-side key;
        generating, by the wearable device, a transaction certificate based on the decrypted device certificate; and
        providing, by the wearable device, the transaction certificate to a payee device.

2. The non-transitory computer readable storage medium of claim 1, the generating the device-side key based on the server-side key comprising generating a key that is identical to the server-side key.

3. The non-transitory computer readable storage medium of claim 1, the providing the device information of the wearable device to the terminal comprising displaying a two-dimensional code including the device information on a screen of the wearable device for the terminal to scan.

4. The non-transitory computer readable storage medium of claim 1, the receiving the device certificate from the server comprising receiving the device certificate from the server via the connection between the wearable device and a terminal.

5. The non-transitory computer readable storage medium of claim 1, further comprising sending, by the wearable device, an authorization request to the server, the authorization request including the device identification of the wearable device.

6. The non-transitory computer readable storage medium of claim 1, the receiving the device certificate from the server comprising receiving the device certificate and a security certificate from the server, the security certificate being used for performing validation of the device certificate during the payment operation.

7. The non-transitory computer readable storage medium of claim 1, the storing the device certificate comprising:
    encrypting, by the wearable device, the device certificate using an encryption algorithm to produce ciphertext; and
    storing, by the wearable device, the ciphertext on the wearable device.

8. A non-transitory computer readable storage medium for tangibly storing computer program instructions capable of being executed by a computer processor, the computer program instructions defining the steps of:
    receiving, by a server, a binding request from a wearable device via a terminal, the binding request including a device identification of the wearable device and user account information associated with the wearable device;
    generating, by the server, a device certificate of the wearable device based on the device identification, the device certificate corresponding to a user account associated with the wearable device;
    receiving, from the wearable device at the server, a server-side key generated by the wearable device;
    storing, by the server, a relationship between the device certificate and a user account associated with the wearable device; and
    providing, by the server, the device certificate to the wearable device, the device certificate enabling the wearable device to perform a payment operation using the user account, the payment operation capable of being performed by the wearable device if an established connection between the wearable device and the terminal is not detected, the providing the device certificate to the wearable device comprising:
    encrypting the device certificate using the server-side key; and
    sending the encrypted device certificate to the wearable device via the terminal.

9. The non-transitory computer readable storage medium of claim 8, the providing the device certificate comprising sending the device certificate to the wearable device via the terminal.

10. The non-transitory computer readable storage medium of claim 8, further comprising receiving, by the server, an authorization request sent by the wearable device, the authorization request including the device identification of the wearable device, and the providing the device certificate to the wearable device comprising returning a response to the authorization request to the wearable device, the response including the device certificate.

11. The non-transitory computer readable storage medium of claim 10, the authorization request further including a server-side key generated by the wearable device, and the device certificate encrypted using the server-side key.

12. The non-transitory computer readable storage medium of claim 8, the providing the device certificate to the wearable device further comprising providing a security certificate to the wearable device, the security certificate used for performing validation on the device certificate during the payment operation.

13. A non-transitory computer readable storage medium for tangibly storing computer program instructions capable of being executed by a computer processor, the computer program instructions defining the steps of:
establishing, by a terminal, a connection between a wearable device and the terminal;
acquiring, by the terminal, device information of the wearable device, the device information including a device identification of the wearable device;
sending, by the terminal, a binding request to a server, the binding request including the device identification of the wearable device and user account information, the binding request enabling the server to generate a device certificate corresponding to a user account associated with the wearable device and provide the device certificate to the wearable device;
receiving, by the terminal, a server-side key from the wearable device using the established connection, the server-side key being used by the server for encrypting the device certificate for the wearable device
transmitting, by the terminal, the device certificate to the wearable device using the established connection, the device certificate enabling the wearable device to perform a payment operation using the user account, the payment operation capable of being performed by the wearable device if the established connection between the wearable device and the terminal is not detected.

14. The non-transitory computer readable storage medium of claim 13, the method further comprising:
receiving, by the terminal, the device certificate provided by the server; and
forwarding, by the terminal, the device certificate to the wearable device using the established connection.

15. The non-transitory computer readable storage medium of claim 13, the acquiring device information of the wearable device comprising:
scanning, by the terminal, a two-dimensional code displayed on a screen of the wearable device; and
acquiring, by the terminal, the device information of the wearable device from the scanned two-dimensional code.

16. A non-transitory computer readable storage medium for tangibly storing computer program instructions capable of being executed by a computer processor, the computer program instructions defining the steps of:

receiving, by a wearable device, a device certificate corresponding to a user account associated with the wearable device from a terminal based on an established connection between the wearable device and the terminal;
storing, by the wearable device, a security certificate corresponding to the user account;
generating, by the wearable device, a transaction certificate according to a stored device certificate for the user account associated with the wearable device, the transaction certificate capable of being generated by the wearable device if the established connection between the wearable device and a terminal is not detected, the generating a transaction certificate comprising generating a transaction certificate carrying validation information using a certificate generation algorithm, the transaction certificate based on the device certificate and the security certificate, the certificate generation algorithm corresponding to a certificate restoration algorithm adopted by the server for retrieving the device certificate and the security certificate from the transaction certificate; and
providing, by the wearable device, the transaction certificate to a payee device, the transaction certificate enabling the payee device to upload the transaction certificate to a server for processing a payment using the user account corresponding to the device certificate.

17. The non-transitory computer readable storage medium of claim 16, the stored device certificate comprising a device certificate ciphertext produced by encrypting the device certificate using an encryption algorithm, and the generating a transaction certificate comprising:
reading, by the wearable device, the device certificate ciphertext;
decrypting, by the wearable device, the ciphertext based on a decryption algorithm; and
generating, by the wearable device, the transaction certificate according to the device certificate obtained from the decrypted ciphertext.

18. The non-transitory computer readable storage medium of claim 16, the transaction certificate including a two-dimensional code or a bar code.

19. A non-transitory computer readable storage medium for tangibly storing computer program instructions capable of being executed by a computer processor, the computer program instructions defining the steps of:
receiving, by a server, a payment collection request sent by a payee device, the payment collection request including a transaction certificate generated by a wearable device and payment sum information, the transaction certificate capable of being generated by the wearable device if an available connection between the wearable device and a terminal is not detected;
restoring, by the server, a device certificate of the wearable device from the transaction certificate, the restoring the device certificate comprising: obtaining the device certificate and a security certificate of the wearable device by executing a certificate restoration algorithm on the transaction certificate, the certificate restoration algorithm corresponding to a certificate generation algorithm used by the wearable device for generating the transaction certificate; and
processing, by the server, a payment according to the payment sum information using a user account corresponding to the device certificate based on a relationship between the device certificate of the wearable device and the user account stored by the server, the processing the payment comprising performing validation on the transaction certificate using the security certificate, and, and if the validation is successful, performing a payment operation according to the payment sum information using the user account corresponding to the device certificate as payer.

20. The non-transitory computer readable storage medium of claim 19, the restoring a device certificate of the wearable device from the transaction certificate further comprising:
obtaining the device certificate and a security certificate of the wearable device by executing a certificate restoration algorithm on the transaction certificate, the certificate restoration algorithm corresponding to a certificate generation algorithm used by the wearable device for generating the transaction certificate, and
the processing the payment further comprising performing validation on the transaction certificate using the security certificate, and, and if the validation is successful, performing a payment operation according to the payment sum information using the user account corresponding to the device certificate as payer.

21. The non-transitory computer readable storage medium of claim 19, the method further comprising returning a result to the payee device indicating whether payment is successful.

22. A wearable device comprising:
a processor; and
a storage medium for tangibly storing thereon program logic for execution by the processor, the stored program logic causing the processor to perform the operations of:
providing device information to a terminal based on an established connection with the terminal, the device information including a device identification;
receiving a device certificate from a server, the device certificate generated by the server based on the device identification and the device certificate corresponding to an associated user account;
generating a device-side key and a server-side key used for encrypting the device certificate during transmission, the device-side key generated based on the server-side key;
storing the device-side key;
transmitting the server-side key to the server; and
storing the device certificate, the device certificate enabling performance of a payment operation using the user account, the payment operation capable of being performed if the established connection with the terminal is not detected, the payment operation comprising:
generating a decrypted device certificate by decrypting the device certificate using the device-side key, the device certificate encrypted by the server using the server-side key;
generating a transaction certificate based on the decrypted device certificate; and
providing the transaction certificate to a payee device.

23. The wearable device of claim 22, the generating the device-side key based on the server-side key comprising generating a key that is identical to the server-side key.

24. The wearable device of claim 22, further comprising a screen, and the providing device information to the terminal comprising displaying a two-dimensional code including the device information on the screen for the terminal to scan.

25. The wearable device of claim 22, the receiving the device certificate from the server comprising receiving the device certificate from the server via the connection with the terminal.

26. The wearable device of claim 22, stored program logic further causing the processor to perform the operation of sending an authorization request to the server, the authorization request including the device identification.

27. The wearable device of claim 22, the receiving the device certificate from the server comprising receiving the device certificate and a security certificate from the server, the security certificate being used for performing validation of the device certificate during the payment operation.

28. The wearable device of claim 22, the storing the device certificate comprising: encrypting the device certificate using an encryption algorithm to produce ciphertext; and storing the ciphertext.

29. A server comprising:
a processor; and
a storage medium for tangibly storing thereon program logic for execution by the processor, the stored program logic causing the processor to perform the operations of:
receiving a binding request from a wearable device via a terminal, the binding request including a device identification of the wearable device and user account information associated with the wearable device;
generating a device certificate of the wearable device based on the device identification, the device certificate corresponding to a user account associated with the wearable device;
receiving a server-side key from the wearable device;
storing a relationship between the device certificate and a user account associated with the wearable device; and
providing the device certificate to the wearable device, the device certificate enabling the wearable device to perform a payment operation using the user account, the payment operation capable of being performed by the wearable device if an established connection between the wearable device and the terminal is not detected, the providing the device certificate to the wearable device comprising:
encrypting the device certificate using the server-side key; and
sending the encrypted device certificate to the wearable device via the terminal.

30. The server of claim 29, the providing the device certificate comprising sending the device certificate to the wearable device via the terminal.

31. The server of claim 29, the stored program logic further causing the processor to perform the operation of receiving an authorization request sent by the wearable device, the authorization request including the device identification of the wearable device; and the providing the device certificate to the wearable device comprising returning a response to the authorization request to the wearable device, the response including the device certificate.

32. The server of claim 31, the authorization request further including a server-side key generated by the wearable device, and the device certificate encrypted using the server-side key.

33. The server of claim 29, the providing the device certificate to the wearable device further comprising providing a security certificate to the wearable device, the security certificate used for performing validation on the device certificate during the payment operation.

34. A terminal comprising:
a processor; and
a storage medium for tangibly storing thereon program logic for execution by the processor, the stored program logic causing the processor to perform the operations of:
  establishing a connection with a wearable device;
  acquiring device information of the wearable device, the device information including a device identification of the wearable device;
  sending a binding request to a server, the binding request including the device identification of the wearable device and user account information, the binding request enabling the server to generate a device certificate corresponding to a user account associated with the wearable device and provide the device certificate to the wearable device;
  receiving a server-side key from the wearable device using the established connection, the server-side key being used by the server for encrypting the device certificate for the wearable device
  transmitting the device certificate to the wearable device using the established connection, the device certificate enabling the wearable device to perform a payment operation using the user account, the payment operation capable of being performed by the wearable device if the established connection is not detected.

35. The terminal of claim 34, the stored program logic further causing the processor to perform the operations of:
receiving the device certificate provided by the server; and
forwarding the device certificate to the wearable device using the established connection.

36. The terminal of claim 34, the acquiring device information of the wearable device comprising:
  scanning a two-dimensional code displayed on a screen of the wearable device; and
  acquiring the device information of the wearable device from the scanned two-dimensional code.

37. A wearable device comprising:
a processor; and
a storage medium for tangibly storing thereon program logic for execution by the processor, the stored program logic causing the processor to perform the operations of:
  receiving a device certificate corresponding to a user account from a terminal based on an established connection with the terminal;
  storing a security certificate corresponding to the user account;
  generating a transaction certificate according to a stored device certificate for the user account, the transaction certificate capable of being generated by the wearable device if the established connection is not detected, the generating a transaction certificate comprising generating a transaction certificate carrying validation information using a certificate generation algorithm, the transaction certificate based on the device certificate and the security certificate, the certificate generation algorithm corresponding to a certificate restoration algorithm adopted by the server for retrieving the device certificate and the security certificate from the transaction certificate; and
  providing the transaction certificate to a payee device, the transaction certificate enabling the payee device to upload the transaction certificate to a server for processing a payment using the user account corresponding to the device certificate.

38. The wearable device of claim 37, the stored device certificate comprising a device certificate ciphertext produced by encrypting the device certificate using an encryption algorithm, and the generating a transaction certificate comprising:
  reading the device certificate ciphertext;
  decrypting the ciphertext based on a decryption algorithm; and
  generating the transaction certificate according to the device certificate obtained from the decrypted ciphertext.

39. The wearable device of claim 37, the transaction certificate including a two-dimensional code or a bar code.

40. A server comprising:
a processor; and
a storage medium for tangibly storing thereon program logic for execution by the processor, the stored program logic causing the processor to perform the operations of:
  receiving a payment collection request sent by a payee device, the payment collection request including a transaction certificate generated by a wearable device and payment sum information, the transaction certificate capable of being generated by the wearable device if an available connection between the wearable device and a terminal is not detected;
  restoring a device certificate of the wearable device from the transaction certificate, the restoring the device certificate comprising: obtaining the device certificate and a security certificate of the wearable device by executing a certificate restoration algorithm on the transaction certificate, the certificate restoration algorithm corresponding to a certificate generation algorithm used by the wearable device for generating the transaction certificate; and
  processing a payment according to the payment sum information using a user account corresponding to the device certificate based on a relationship between the device certificate of the wearable device and the user account, the processing the payment comprising performing validation on the transaction certificate using the security certificate, and, and if the validation is successful, performing a payment operation according to the payment sum information using the user account corresponding to the device certificate as payer.

41. The server of claim 40, the restoring a device certificate of the wearable device from the transaction certificate further comprising:
  obtaining the device certificate and a security certificate of the wearable device by executing a certificate restoration algorithm on the transaction certificate, the certificate restoration algorithm corresponding to a certificate generation algorithm used by the wearable device for generating the transaction certificate, and
  the processing the payment further comprising performing validation on the transaction certificate using the security certificate, and, and if the validation is successful, performing a payment operation according to the payment sum information using the user account corresponding to the device certificate as payer.

42. The server of claim 40, the stored program logic further causing the processor to perform the operations of returning a result to the payee device indicating whether payment is successful.

* * * * *